United States Patent [19]

Schulz

[11] Patent Number: 4,484,771
[45] Date of Patent: Nov. 27, 1984

[54] FLANGE FOR CONNECTING PIPES

[75] Inventor: Wilhelm Schulz, Krefeld, Fed. Rep. of Germany

[73] Assignee: Schulz & Company KG, Krefeld, Fed. Rep. of Germany

[21] Appl. No.: 332,314

[22] Filed: Dec. 18, 1981

[30] Foreign Application Priority Data

Dec. 18, 1980 [EP] European Pat. Off. ......... 80108019.3

[51] Int. Cl.³ .............................................. F16L 23/00
[52] U.S. Cl. .................................... 285/138; 285/368; 285/416; 285/DIG. 2; 285/413
[58] Field of Search ............... 285/368, 412, 413, 414, 285/138, 286, 416, DIG. 2

[56] References Cited

U.S. PATENT DOCUMENTS 3,975,468  8/1976  Tuckey ........................... 285/414 X
4,105,227  8/1978  Ekberg et al. ..................... 285/412

FOREIGN PATENT DOCUMENTS 7910337   3/1981  European Pat. Off. .
124715    2/1901  Fed. Rep. of Germany .
1960147   5/1967  Fed. Rep. of Germany .
2119547   11/1971 Fed. Rep. of Germany .
7127540   11/1971 Fed. Rep. of Germany .
2059486   6/1972  Fed. Rep. of Germany .
2203809   8/1973  Fed. Rep. of Germany ...... 285/368
2236562   2/1974  Fed. Rep. of Germany .
2807444   8/1979  Fed. Rep. of Germany ...... 285/412
674447    2/1930  France .

Primary Examiner—Dave W. Arola
Attorney, Agent, or Firm—Kenyon & Kenyon

[57] ABSTRACT

A flange for connecting piping is disclosed which comprises a ring form which can be welded along its inner edge to a pipe, and a flange ring. The ring form and the flange ring are both preferably of U-shaped cross section. The flange ring has holes for the insertion of clamping bolts and, when the flange connection is tightened, contacts an outer rim of the ring form. The inner rim of the flange ring has a height which is greater by a predetermined length than the height of the outer rim of the ring form. The predetermined length is selected so that when the clamping bolts are tightened, the flanged or base portion of the flange ring contacts the outer rim of the ring form after elastic re-shaping of the flange ring has taken place.

13 Claims, 9 Drawing Figures

FLANGE FOR CONNECTING PIPES

BACKGROUND OF THE INVENTION

The present invention relates to a flange for connecting pipes, inserting fittings in piping or connecting pipes or fittings to containers and the like.

A variety of flanges are known for removably connecting pipe sections, for installing fittings in piping, for connecting pipes or fittings to containers and the like, and for connecting flanged pipes or covers onto containers and the like. In general the flanges or flanging include a smooth ring of rectangular cross-section (as for example in DE-PS No. 124 715). However, profiled flange rings are also known (as for example in DE-OS No. 20 59 484) of continuous S-shaped cross-section. The flange rings are welded either to a pipe or pipe nozzle or are welded onto the end section of a pipe or pipe nozzle as a welded slip-on flange (as for example in DE-OS No. 21 19 547, FIG. 1). However it is also possible to secure the flange ring on the pipe or pipe nozzle by fixing it against either the raised edge of the end of the pipe or pipe nozzle or a raised edge welded to the end of the pipe or nozzle.

Flange rings are also known which are of U-shaped cross-section. In the apparatus described in DE-GM 71 27 540, the U-shaped profile of the flange ring adds to the strength and stability of the flange, making possible a reduction in the amount of material used. As described in DE-OS 22 36 562, a circular receiving seat of an expansion joint is supported by a U-shaped flange ring with one side of the circular seat being supported on the inner ridge of the U-shaped flange ring and otherwise on the inner edge of the U-shaped flange ring.

A flange joint is constructed with the object of achieving a secure seal of the flange to the connection point while keeping cost as low as possible. In furtherance of this object, high quality material is used where corrosive material comes into contact with the flange joint and lower quality material can be used for other flange joint parts.

Conventional flanges constructed in the above-described manner have not been entirely satisfactory. Since the clamping bolts which are tightened to effect sealing are disposed about the flange spaced radially from the sealing surfaces, the pressing force generated by tightening the clamping bolts develops a bending moment on the flange which brings about an inclined positioning of the sealing surfaces in relation to each other. The sealing or packing which is disposed adjacent to the sealing surface is accordingly deformed in cross section into the shape of a wedge which is thinner at the outer portion of the sealing as a result of higher forces being applied thereat. This occurs in the flange joint disclosed in FR-PS No. 674 447, in which a flange ring of rectangular cross-section bent into a U-shape is disposed at the end of a pipe. The pressing force brought about by tightening the clamping bolts is exerted largely along the outer edge of the U-shaped part of the flange and from there transmitted to the sealing surface, so that the sealing is progressively compacted from the outer edge radially inwardly, resulting in greater compression along the outer portion of the sealing. In DE-GM No. 19 60 147, the sealing is deliberately non-uniformly compressed with the greatest pressure occurring between the inner and outer portions of the sealing.

In the apparatus disclosed in FR-PS No. 647 447 and DE-GM No. 19 60 147, a bending moment set up in the flange ring about its outside edge as the clamping bolts are tightened lifts the inner rim of the flange ring up from the bearing surface at the end of the pipe. To prevent this, a flange connection such as the one disclosed in European Patent No. 79103337 is used. That flange connection comprises an inner rim welded to or on the pipe, pipe nozzle, fitting or container, and an outer rim on a section of the flange disposed radially inwardly from the holes for the clamping bolts but as close as possible thereto which forms the rest and support for the flange ring. The base or flanged area of the outer rim forms the sealing area and an abutment for a flange ring of L-shaped cross section is provided on the inner rim of the ring form part. The abutment supports the inner edge of the flange ring against forces produced by tightening the clamping bolts and prevents an axial movement of the flange ring on the pipe. The apparatus described in this paragraph does not achieve the object described above and does not achieve uniform compression of the sealing.

OBJECTS AND SUMMARY OF THE INVENTION

The applicant recognizes that uniform compression of a flange sealing to maintain its shape would produce a better seal because leakage about the sealing under increased pressure within the piping would be less likely to occur.

It is therefore an object of the present invention to provide a flange construction in which the sealing between flange parts is uniformly compressed.

It is another object of the present invention to provide a flange construction in which the sealing between flange parts is pre-tensioned along the inner portion of the sealing.

These and other objects of the invention are achieved by providing a flange comprising a flange ring of L- or U-shaped cross-section having an inner rim extending at an angle of about 90° with respect to and in the direction of the sealing surface, and a ring form of L- or U-shaped cross-section having a flanged or base portion which can in part form the sealing surface and an outer rim extending at an angle of about 90° with respect to and away from the sealing surface, the height of the inner rim of the flange ring being greater by a predetermined length than the height of the outer rim of the ring form. The predetermined length is selected so that upon tightening the clamping bolts, the flanged or base portion of the flange ring comes to rest in contact with the outer rim of the ring form only after a certain amount of elastic distortion of the flange ring occurs. The predetermined length should lie, according to a nominal piping bore, in the approximate region of tenths of a millimeter to millimeters. The greater the nominal bore of the piping (and the flange), the greater the predetermined length can be.

It is preferred that the inner rim of the flange ring lie as near as possible to an inner rim or edge of the ring form so that the force applied upon tightening the clamping bolts first becomes effective on the inner edge of the sealing.

In accordance with the invention, a connecting flange comprises a flange ring having a flanged or base portion with holes therethrough for receiving bolts used to clamp the flange, the flange ring further having an inner rim extending at an angle of about 90° with respect to and in the direction of a sealing surface, a ring form adapted to be secured to piping, a fitting, a container or the like having a flanged or base portion (which can form in part the sealing surface) and an outer rim extending at an angle of about 90° with respect to and away from the sealing surface, the flanged portion of the flange ring contacting the outer rim of the ring form in a tightened condition of the flange, the inner rim of the flange ring having a height which is greater by a predetermined length than the height of the outer rim of the ring form, the predetermined length being selected so that in the tightened condition of the flange, the flanged portion of the flange ring contacts the outer rim of the ring form after the elastic flexing or re-shaping of the flange ring has taken place.

The flange according to the invention has the advantage of effecting uniform or symmetrical compression of the whole sealing area and/or the further advantage of prestressing the inner edge of the sealing which then opposes any tendency of the seal to leak from pressure acting from the interior of the piping, which advantages so far as the applicant is aware connot be achieved by any known flange. These effects achieved by the flange according to the invention result from the generation of a force upon tightening the clamping bolts acting at first only over the inner rim of the flange ring on the ring form welded to the end of the pipe; only after the gap of predetermined length between the flanged portion of the flange ring and the outer rim of the ring form is closed is force generated in the flange connection over the outer rim or edge of the ring form. The force is then transferred from the outer and inner edges of the ring form to the sealing surface, providing a uniform pressure on the sealing.

The parts which comprise the flange according to the invention are simple in form and thus have the further advantage that they can be produced as pressed parts at comparatively low cost. Because of the stable construction of the flange, the cross-sectional thickness of the flange parts can be less than that of forged flanges, which not only results in reducing material costs but also has the advantage that less energy is required to form the flange parts and therefore a lighter duty, less costly production line can be used.

It is preferred that the outer rim of the ring form lie as near as possible to the bolt holes in the flange ring, e.g. at the edge of or on a circle formed by the bolt holes, so that forces generated upon tightening the clamping bolts act over short lever arms to the sealing surface.

The flange ring can be welded to the inner rim of the ring form or pipe to which the ring form is welded where a fixed flange connection is desired. The flange ring can also be secured loosely to the ring form or pipe. To accomplish the latter, stops can be provided on the inner rim of the ring form or on the pipe which prevent axial movement of the flange ring on the ring form or the pipe, but at the same time permit rotation of the flange ring about the ring form.

To satisfy high rust or corrosion resistance requirements, only the ring form need to be made of high quality material while the flange ring, which does not come into contact with the material flowing through the piping, can be made of lower quality material, e.g. carbon steel. Thus it is possible to form the ring form as well as the flange ring in pressed or cast forms. The ring form can also be produced as a part having a raised inner edge and a welded-on outer rim.

It is preferred that the ring form and flange ring are both of U-shaped cross-section with the arms of the U of the ring form facing the arms of the U of the flange ring in the assembled configuration of the flange connection and, as mentioned, that the outer rim of the ring form be as close as possible to the bolt holes in the flange ring. In all configurations, the inner rim of the flange ring has a height which is greater by a predetermined gap length than the height of the outer rim of the ring form.

It is further preferred that the inner diameter of the flange ring (relative to the axis of the flange) is slightly greater than the outer diameter of the inner rim of the ring form which is preferably tubular.

Flange parts of U-shaped cross-section, which are per se known for providing rigidity while saving material, provide in accordance with the invention a mutual support for generating force at two regions in the sealing surface. Locating the outer rim of the ring form as close as possible to the bolt holes ensures that a pressing force is generated along the shortest possible path to the sealing surface, so that no great bending moment is brought to bear that could lead to deformation of the sealing surface. The difference in height of the inner rim of the flange ring and the outer rim of the ring form, the height of the inner rim of the flange ring being greater by a predetermined distance, together with the other features of the invention results in uniform compression of sealing as well as elastic pre-tensioning of the inner portion of the sealing.

The above and other objects, features, advantages and aspects of the invention will be more apparent from the following description of the preferred embodiments thereof when considered with the accompanying drawings and appended claims.

BRIEF DESCRIPTION OF THE DRAWINGS

The present invention is illustrated by way of example and not limitation in the figures of the accompanying drawings in which like references indicate similar parts and in which.

DESCRIPTION OF THE PREFERRED EMBODIMENTS

Referring more particularly now to the drawings, embodiments of flange connections and parts thereof according to the invention are illustrated.

Figure 1:
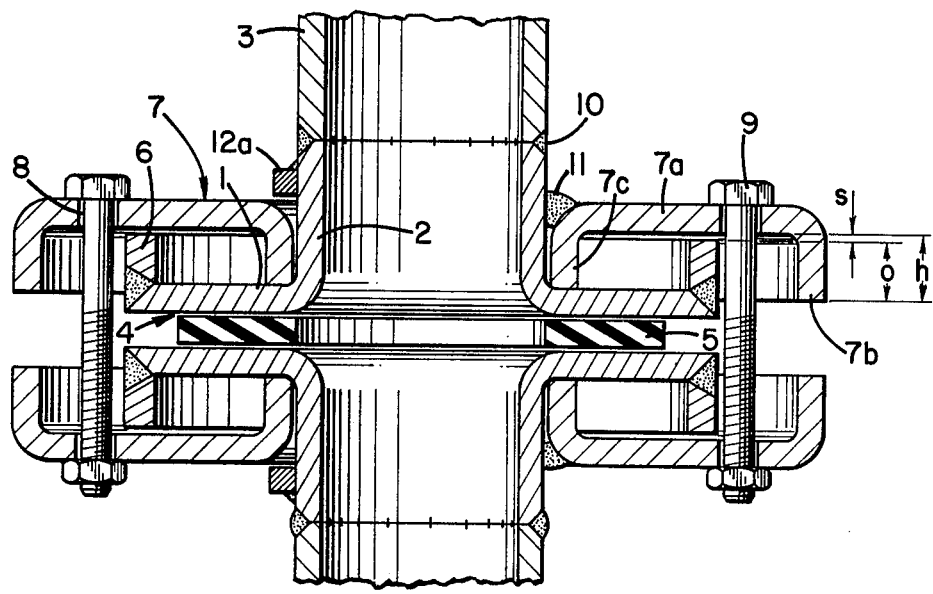
FIG. 1 shows a flange connection in accordance with the invention with the upper part thereof in an axial cross-section.
Figure 2:
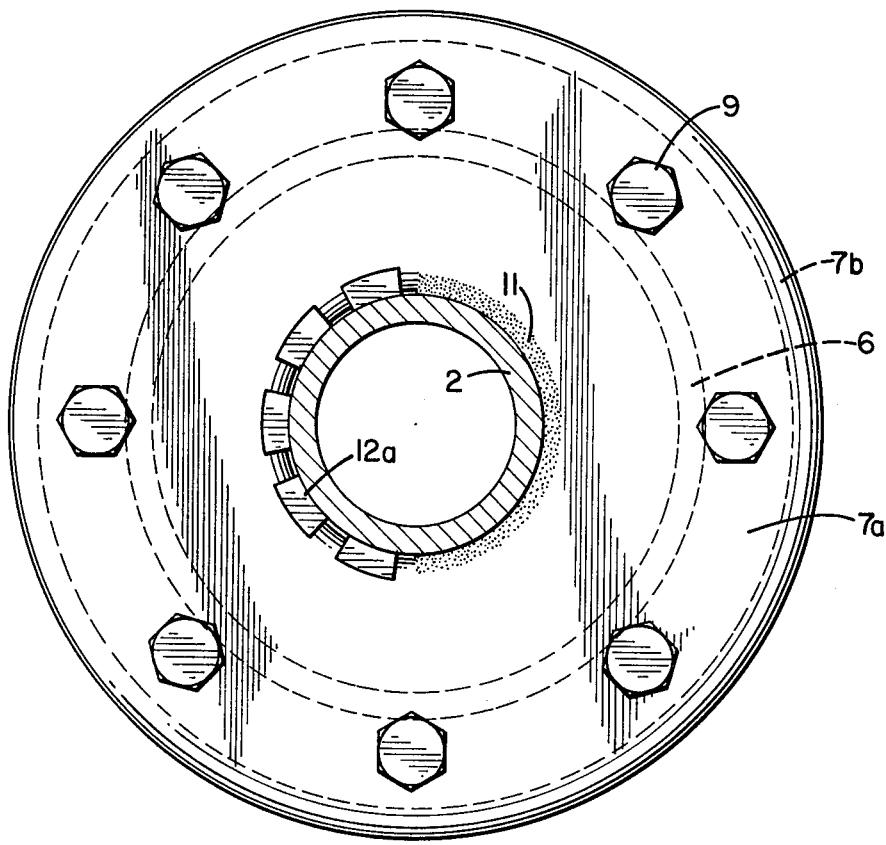
FIG. 2 is a section view taken radially through a part of the upper flange ring of the flange connection of FIG. 1.

Referring to FIG. 1, a ring form 1 of U-shaped cross-section is welded along its tubular inner rim 2 to the end of a pipe 3 or pipe nozzle. The ring form 1 includes a cross-piece, flanged or base portion 4 which forms a sealing surface against which a lagging or sealing 5 is disposed, and a ring-shaped outer rim 6 which forms a seat and support for a flange ring 7. The outer rim 6 can be formed as an integral part of the ring form 1 or can be welded thereto. The flange ring 7 includes a cross-piece, flanged or base portion 7a which has holes 8 therein for receiving clamping bolts 9, an outer rim 7b and an inner rim 7c, both extending at about an angle of 90° with respect to and in the direction of the sealing surface.

Figure 7:
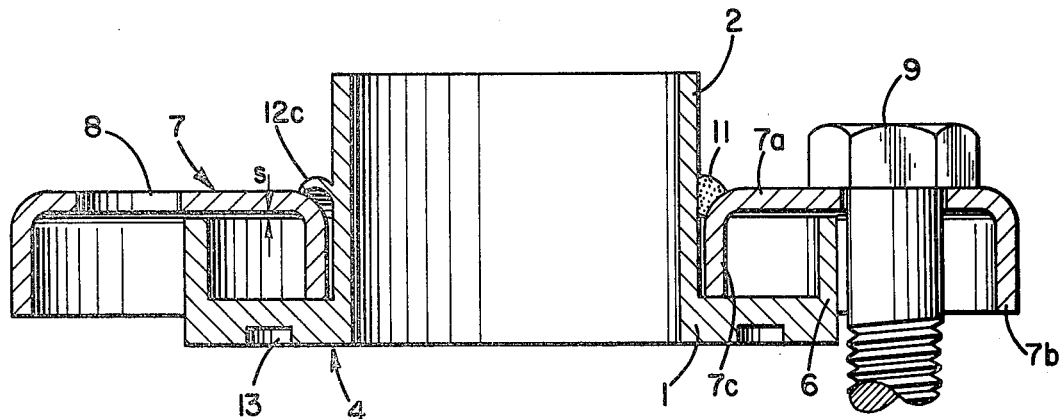
FIG. 7 shows the upper part in axial cross-section of a flange connection according to another embodiment of the invention.

The flange ring 7 can be rigidly fixed to the ring form 1 by welding the inner rim 7c of the flange ring to the inner rim 2 of the ring form 1 along a weld seam 11, as shown on the right side of FIGS. 1 and 7.

The flange ring 7 can also be loosely secured to the ring form 1 by means of stops 12 on the inner rim of the ring form 1. The stops can be welded-on spacing pieces 12a (FIGS. 1 and 3), impressions 12b (FIG. 5) or a ring beading 12c (FIG. 4) bent into a hook shape by pushing material away from the upper surface of the inner rim 2 of the ring form 1.

The inner rim 2 of the ring form 1 is axially longer than the outer rim 6 so that the weld seam 10 between ring fomr 1 and the pipe 3 is accessible. Additionally, this enables the ring flange 7 to be loosely secured to the ring form part 1 by the stops, impressions or beading, as described above, on the inner rim 2 of the ring from 1.

Figure 4:
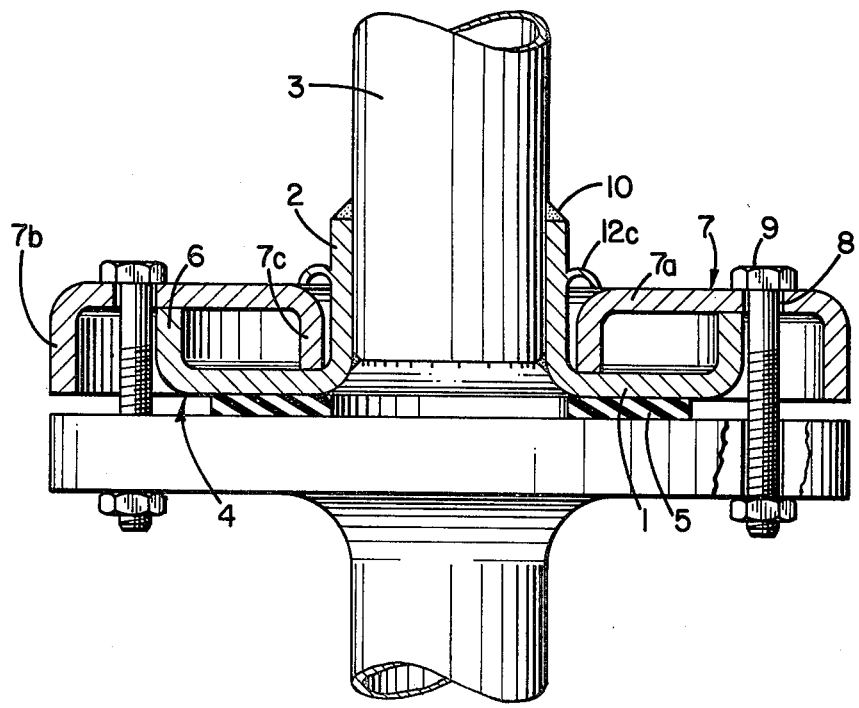
FIG. 4 shows the flange connection of FIG. 3 in a tightened condition with the upper part in axial section.

FIG. 1 shows the flange connection before it is tightened, i.e. with the bolts 9 loose. In this condition, between the flanged portion 7a of the flange ring 7 and the outer rim 6 of the ring form 1, a gap of predetermined length s is provided which represents the difference between the height h of the inner rim 7c of the flange ring and the height o of the outer rim 6 of the ring form 1. Thus, when the clamping bolts 9 are initially tightened, the flange ring 7 is elastically distorted, flexed or re-shaped and a pressing force is generated adjacent to the inner rim 2 of the ring form 1 and transferred to the inner portion or region of the sealing. As a result, the inner portion of the sealing is pre-tensioned. On further tightening the clamping bolts 9, the gap of lengths between the flanged portion 7a and the outer rim 6 is closed and a force is generated in the sealing surface of the ring form flanged portion 4 extending from the outer rim 6 of the ring form 1 on the outside uniformly to the inner rim 7c on the inside. Thereby uniform compression of the sealing 5 over its entire diameter is achieved. FIG 4 shows the final configuration of the flange connection in its fully tightened state.

To achieve the greatest possible stability, the outer rim 6 of the ring form 1 which provides the support for the ring flange 7 is located as close as possible to the bolt holes 8, that is, at the point of penetration of the bolts into the flange ring 7, so that the shortest possible lever arm is established between the points of penetration and the support for the flange ring 7 provided by the outer rim 6 of the ring form 1.

Figure 3:
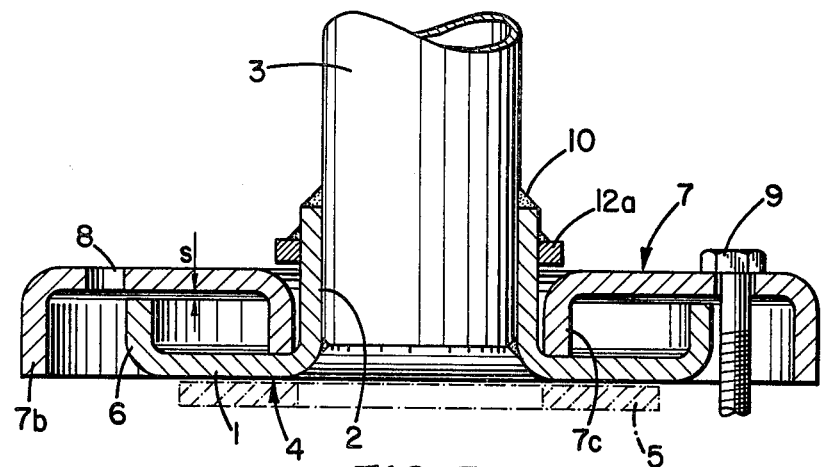
FIG. 3 shows the upper part in axial cross-section of a flange connection according to another embodiment of the invention.

The embodiment of the flange according to the invention shown in FIG. 3 differs from that shown in FIG. 1 in that the ring form 1 is not welded to the end of the pipe 3 but is slid over and welded to the end portion of the pipe as a slip-on weld flange. Also the flange ring 7 is not welded to the ring form 1 but rotates freely as a loose part around the circumference of the ring form. At one position of the flange ring 7, bolt holes 8 are aligned with those in the flange ring of the other half of the connection.

Figure 5:
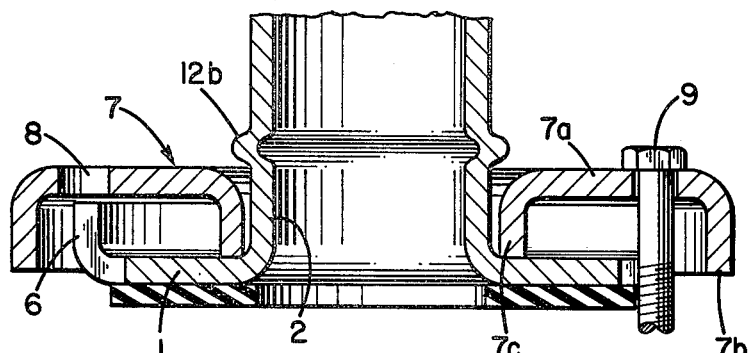
FIG. 5 shows the upper part in axial cross-section of a flange connection according to another embodiment of the invention.
Figure 6:
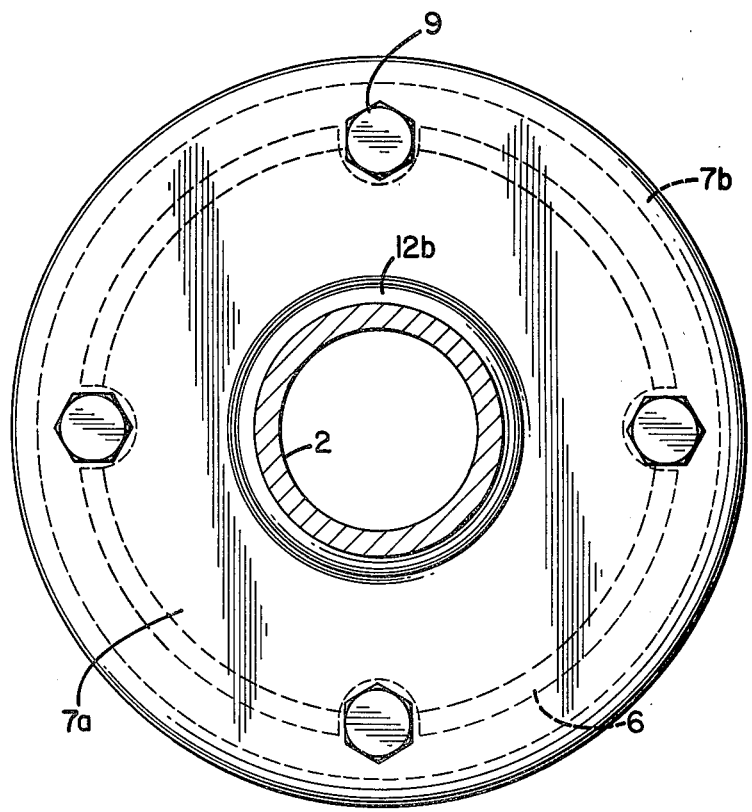
FIG. 6 is a section view taken radially through a part of the upper flange ring of the flange connection of FIG. 5.

In FIGS. 5 and 6 an embodiment of the flange according to the invention is illustrated in which the outer rim 6 of the ring form 1 has a diameter equal to that of the pitch circle for the bolt holes 8 and is separated in the area of the bolt holes 8 (FIG. 6).

In the embodiment shown in FIG. 7, the thickness of the wall of the ring form 1 is greater in the area of the sealing surface 4 and a key groove 13 is provided in the thickened portion for a spring groove connection. The ring form of the opposing half of the connection, which is not shown, is provided with the spring which is received in the key 13.

As shown on the right hand side of FIG. 7, the flange ring 7 is welded along the weld seam 11 to the ring form and so is provided as a fixed flange. An alternate arrangement is shown in the left hand side of FIG. 7 in which the flange is provided as a loose flange and a stop in the form of a ring beading 12c, as described above with respect to FIG. 4, is provided to prevent axial movement of the loose flange ring 7 on the ring form 1; the loose ring flange 7 can however be rotated to bring the bolt holes 8 of the opposed flange rings into alignment.

Figure 8:
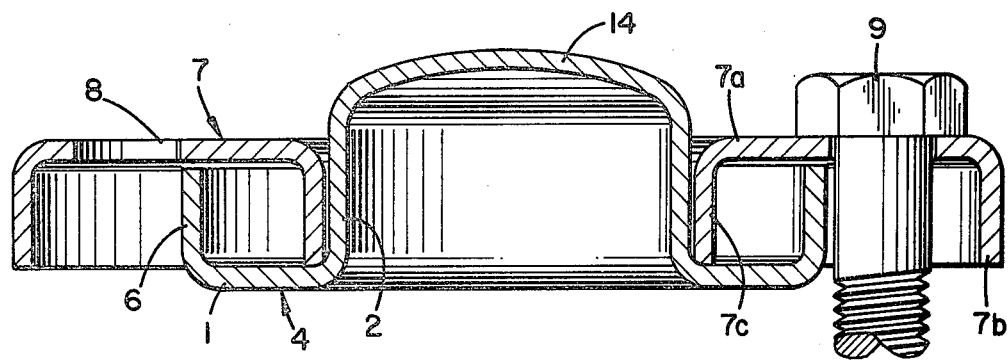
FIG. 8 shows a blank in axial cross-section for an upper part of a flange connection according to another embodiment of the invention.

The flange according to the invention can be provided as a one piece blank as shown in FIG. 8. In addition, a convex sealing floor 14 can be formed as part of the tubular inner rim 2 of the ring form 1.

Figure 9:
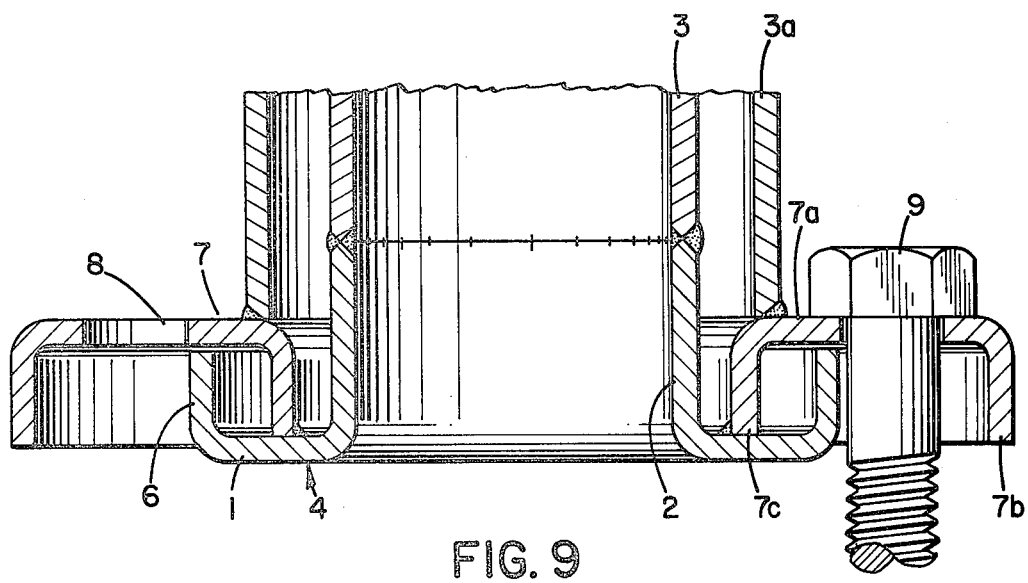
FIG. 9 shows the upper part in axial cross-section of a flange connection in accordance with the invention for heated or cooled pipes, containers or fittings.

FIG. 9 depicts an embodiment of the flange according to the invention for use with a heated or cooled pipe arrangement which includes an inner pipe 3 and an outer or mantle pipe 3a between which a heating or cooling material flows. In this embodiment, the inner rim 7c of the flange ring 7 is intentionally spaced from the inner rim 2 of the ring form 1 so that the heating or cooling material can flow through the space to the sealing surface 4, thereby heating or cooling the sealing surface the same as the other parts of the pipe to avoid thermal stress in the region of the flange.

FIGS. 7 to 9 each show the flange before tightening, that is, with the gap of length s open between the outer rim 6 of the ring form 1 and the flanged portion 7a of the flange ring 7.

The advantages of the present invention, as well as certain changes and modifications of the disclosed embodiments thereof, will be readily apparent to those skilled in the art. It is the applicant's intention to cover by his claims all those changes and modifications which could be made to the embodiments of the invention herein chosen for the purposes of the disclosure without departing from the spirit and scope of the invention.

What is claimed is:

1. A connecting flange comprising
   a flange ring having a flanged portion comprising an inner rim and an outer rim with holes through the flange ring between the rims for receiving bolts used to clamp the flange, the flange ring being generally of U-shaped cross-section with the inner rim and the outer rim extending transversely with respect to and in the direction of a sealing surface, a ring form having a flanged portion and an outer rim extending transversely with respect to and away from the sealing surface, the flanged portion of the flange ring contacting the outer rim of the ring form in a tightened condition of the flange, the outer rim of the ring form being located approximately inwardly of a circle formed by the outer peripheries of the holes in the flange ring, and means for limiting axial movement of the flange ring relative to said ring form adjacent the inner rim of the flange ring, the inner rim of the flange ring having a height which is greater by a predetermined length than the height of the outer rim of the ring form, the predetermined length being selected so that in the tightened condition of the flange, the flanged portion of the flange ring contacts the outer rim of the ring form after the inner rim contacts the flanged portion of the ring form and an elastic re-shaping of the flange ring has taken place.

2. A flange according to claim 1 wherein the predetermined length is in the approximate region of tenths of a millimeter to several millimeters.

3. A flange according to claim 1 wherein the ring form is of U-shaped cross section having an inner rim.

4. A flange according to claim 3 wherein the inner diameter of the flange ring is slightly greater than the outer diameter of the inner rim of the ring form.

5. A flange according to claim 1 or 3 wherein the means for limiting comprising a weld of the flange ring to the ring form.

6. A flange according to claim 1 or 3 wherein the means for limiting comprises a stop provided on the ring form.

7. A flange according to claim 1 wherein the ring form is made of corrosion resistant material and the flange ring is made of a lower quality material.

8. A flange according to claim 1 wherein the flanged portion of the ring form comprises the sealing surface.

9. A flange according to claim 1 wherein the inner and outer rim of the flange ring extend at an angle of about 90° with respect to and in the direction of the sealing surface, and the outer rim of the ring form extends at an angle of about 90° with respect to and away from the sealing surface.

10. A flange according to claim 1 including means disposed on the side of the sealing surface opposite to the side on which the connecting flange is disposed to which the flange ring is tightened.

11. A flange according to claim 10 wherein said means comprises another said flange ring and another said ring form.

12. a flange according to claim 10 wherein said means comprises a ring form of circular cross-section.

13. A flange according to claim 1 or 4 wherein a pipe is connected to the ring form and the means for limiting comprises a stop provided on the pipe adjacent the inner ring of the flange ring.

* * * * *